(12) United States Patent
Ito

(10) Patent No.: US 8,939,185 B2
(45) Date of Patent: Jan. 27, 2015

(54) PNEUMATIC RADIAL TIRE

(75) Inventor: Toshiharu Ito, Higashimurayama (JP)

(73) Assignee: Bridgestone Corporation, Tokyo (JP)

( * ) Notice: Subject to any disclaimer, the term of this patent is extended or adjusted under 35 U.S.C. 154(b) by 77 days.

(21) Appl. No.: 13/496,432

(22) PCT Filed: Sep. 16, 2010

(86) PCT No.: PCT/JP2010/005662
§ 371 (c)(1),
(2), (4) Date: Mar. 15, 2012

(87) PCT Pub. No.: WO2011/033778
PCT Pub. Date: Mar. 24, 2011

(65) Prior Publication Data
US 2012/0168052 A1    Jul. 5, 2012

(30) Foreign Application Priority Data
Sep. 16, 2009   (JP) .................................. 2009-214632

(51) Int. Cl.
*B60C 15/06* (2006.01)
*B60C 15/00* (2006.01)

(52) U.S. Cl.
CPC .......... *B60C 15/06* (2013.01); *B60C 2015/009* (2013.04); *B60C 15/0607* (2013.04);
(Continued)

(58) Field of Classification Search
CPC   B60C 15/0009; B60C 15/0027; B60C 15/06; B60C 15/0603; B60C 15/0607; B60C 2015/009; B60C 2015/061; B60C 2015/0614

USPC ................. 152/541, 543, 546, 547, 552, 554
See application file for complete search history.

(56) References Cited

U.S. PATENT DOCUMENTS 4,387,759 A * 6/1983 Obata et al. ............... 152/541 X
5,476,129 A * 12/1995 Shoyama .................. 152/543 X
(Continued)

FOREIGN PATENT DOCUMENTS

CN   1426909 A   7/2003
JP   8-040027 A   2/1996
(Continued)

OTHER PUBLICATIONS

English machine translation of Japanese Patent Application 2007-45361 A, Feb. 22, 2007.*
(Continued)

*Primary Examiner* — Adrienne C Johnstone
(74) *Attorney, Agent, or Firm* — Sughrue Mion, PLLC

(57) ABSTRACT

Provided is a pneumatic radial tire having a rubber chafer arranged on the carcass ply in a contacting area of a bead portion with a rim; a bead filler arranged radially outside on the bead core; and a side rubber extending along an outer surface of the carcass in each a side wall portion. When inflated with a predetermined pneumatic pressure, an outer end of the folded portion of the carcass and an outer end of the bead filler are placed inward from an outer end r of a rim flange of the rim in the radial direction; an outer end of the rubber chafer is placed outward from the outer end r of the rim flange in the radial direction; and a part of a side rubber located outward from the outer end of the rim flange in the radial direction is disposed between the rubber chafer.

3 Claims, 5 Drawing Sheets

(52) U.S. Cl.
CPC ......... *B60C15/0009* (2013.04); *B60C 15/0603* (2013.04); *B60C 15/0027* (2013.04); *B60C 2015/0614* (2013.04); *B60C 2015/061* (2013.04)
USPC .......... 152/541; 152/543; 152/546; 152/547; 152/552; 152/554

(56) References Cited

U.S. PATENT DOCUMENTS

| | | | | |
|---|---|---|---|---|
| 6,053,229 | A * | 4/2000 | Suzuki | 152/546 X |
| 6,866,494 | B2 * | 3/2005 | Tomlinson | |
| 6,875,004 | B2 * | 4/2005 | Shimada | |

FOREIGN PATENT DOCUMENTS

| | | |
|---|---|---|
| JP | 8-048118 A | 2/1996 |
| JP | 10-076819 A | 3/1998 |
| JP | 2000-185516 A | 7/2000 |
| JP | 2001-225618 A | 8/2001 |
| JP | 2001-233013 A | 8/2001 |
| JP | 2006-131095 A | 5/2006 |
| JP | 2007-045361 A | 2/2007 |

OTHER PUBLICATIONS

Extended European Search Report dated Nov. 29, 2012 issued in European Patent Application No. 10816892.3.

Chinese Office Action, dated Nov. 14, 2013, issued in corresponding Chinese Patent Application No. 201080044840.8.

Japanese Office Action issued in Japanese Application No. 2011-531794 dated Jul. 1, 2014.

Chinese Office Action, dated Jul. 28, 2014, issued in corresponding Chinese Patent Application No. 201080044840.8.

\* cited by examiner

PNEUMATIC RADIAL TIRE

CROSS REFERENCE TO RELATED APPLICATIONS

This application is a National Stage of International Application No. PCT/JP2010/005662 filed Sep. 16, 2010, claiming priority based on Japanese Patent Application No. 2009-214632 filed Sep. 16, 2009 the contents of all of which are incorporated herein by reference in their entirety.

TECHNICAL FIELD

The present invention relates to a pneumatic radial tire, and in particular, proposes a technique for improving a pinch cut resistance of such tire without increasing the weight of the tire.

RELATED ART

In recent years, from the viewpoint of environmental friendliness and running cost, there has been an increasing demand for more fuel efficient pneumatic radial tires. In response to the demand, the weight of the tire has been reduced, for example, by lowering a radial height of a folded portion of a carcass or a radial height of an outer end of a bead filler in the radial direction.

However, with the method for reducing the weight of the tire as described above, the strength of the tire is deteriorated in the vicinity radially outside of a rim flange of an applicable rim. This easily leads to sandwiching of the carcass located at a side wall portion between the rim flange of the applicable rim and a curb at the time, for example, when the tire drives over the curb as illustrated in a sectional view in the tire width direction of FIG. 4. The local deformation occurring at this time results in the breakage of the cord of the carcass, causing a problem of a so-called pinch cut.

As a method for improving a pinch cut resistance, it is known that the carcass is strengthened by increasing the number of plies of the carcass or increasing the diameter of the cord, or by disposing the bead filler on the outer side in the tire width direction of the folded portion of the carcass folded around the bead core such that the bead filler is located outside of the outer end of the rim flange of the applicable rim in the radial direction as described in Patent Document 1. However, with this method, the amount of cord in the carcass and the amount of rubber of the rubber chafer increase, and hence, it is not possible to achieve the reduction in the weight in a desired manner.

Thus, with the conventional pneumatic radial tire, it was difficult to achieve both the reduction in weight of the tire and the improvement in the pinch cut resistance.

RELATED ART DOCUMENT

Patent Document

Patent Document 1: Japanese Patent Application Laid-open No. 8-048118

DISCLOSURE OF THE INVENTION

Problems to be Solved by the Invention

An object of the present invention is to provide a pneumatic radial tire having improved pinch cut resistance without increasing the weight of the tire.

Means for Solving the Problem

A pneumatic radial tire according to the present invention includes: a tread portion; a pair of side wall portions; a pair of bead portions, each bead portion having an area contacting with an applicable rim; a carcass formed by plural carcass plies and having a body portion toroidally extending between the bead cores in the bead portions and a folded portion folded around each of the bead cores; a rubber chafer arranged on the carcass ply in the contacting area of the bead portion; a bead filler arranged on the bead core, the bead filler having a generally triangle cross sectional shape extending outwardly in the radial direction with a thickness gradually decreasing toward the outer side; and a side rubber extending along an outer surface of the carcass in each of the side wall portions. In a state where the tire is mounted on the applicable rim and inflated with a predetermined pneumatic pressure, an outer end of the folded portion of the carcass and an outer end of the bead filler are placed inward from an outer end of a rim flange of the applicable rim in the radial direction; an outer end of the rubber chafer is placed outward from the outer end of the rim flange in the radial direction; and at least a part of the side rubber located outward from the outer end of the rim flange in the radial direction is disposed between the rubber chafer and the carcass.

It should be noted that the "state where the tire is mounted on the applicable rim and inflated with a predetermined pneumatic pressure" refers to a state where the tire is mounted on a rim specified in industrial standards effective in a region where the tire is manufactured or used, the industrial standard including, for example, "Japan Automobile Tyre Manufacturers Association (JATMA) YEAR BOOK" in Japan, "European Tyre and Rim Technical Organisation (ETRTO) Standards Manual" in Europe, and "The Tire and Rim Association Inc. (TRA) Year Book" in the United States, and is inflated with a maximum air pressure specified in the standard such as JATMA for each tire size.

In the tire as described above, it is preferable that a squeegee rubber is disposed between the body portion and the folded portion of the carcass, and it is further preferable that an outer end of the squeegee rubber is placed outward from the outer end of the rim flange in the radial direction.

Further, it is preferable that the side rubber located between the rubber chafer and the folded portion of the carcass has 100% modulus in the range of ⅓ to ½ of that of the rubber chafer.

In this specification, the term "100% modulus" refers to a tensile stress required to produce a 100% elongation according to JIS K6251 by a tensile test at a rate of 500±25 mm/min at a room temperature with a JIS No. 3 dumbbell sample.

Further, it is preferable that the outer end of the folded portion of the carcass is placed inward from the outer end of the rim flange in the radial direction by −10 mm to +10 mm; the outer end of the bead filler is placed inward from the outer end of the rim flange in the radial direction by −15 mm to 0 mm; the outer end of the rubber chafer is placed between a point located inward from the outer end of the folded portion of the carcass by 5 mm and the maximum width point of the tire in the radial direction; and the outer end of the squeegee rubber is placed outward from the outer end of the rim flange in the radial direction by −15 mm to +15 mm.

Effect of the Invention

According to the pneumatic radial tire of the present invention, the outer end of the folded portion of the carcass and the outer end of the bead filler are placed inward from the outer end of the rim flange of the applicable rim in the radial direction in a state where the tire is mounted on the applicable rim and inflated with a predetermined pneumatic pressure, whereby the weight of the tire can be reduced without deteriorating the ride comfort and the strength of the carcass.

Further, the outer end of the rubber chafer is placed outward from the outer end of the rim flange of the applicable rim in the radial direction, whereby a surface of the tire contacting with the rim flange can be prevented from wearing out due to a friction against the rim.

Yet further, a part of the side rubber located outward from the outer end of the rim flange of the applicable rim in the radial direction is disposed between the rubber chafer and the carcass. With this configuration, at the carcass located outward from the outer end of the rim flange in the radial direction and sandwiched between a curb and the rim flange at the time when the tire drives over the curb or the like, the stress concentration occurring to the carcass due to the sandwiching between the curb and the rim flange can be alleviated with the elastic modulus of the side rubber to suppress the breakage of the cord of the carcass. This makes it possible to prevent the occurrence of the pinch cut.

BEST MODE FOR CARRYING OUT THE INVENTION

Hereinbelow, a pneumatic radial tire according to the present invention will be described in detail with reference to the drawings.

Figure 1:
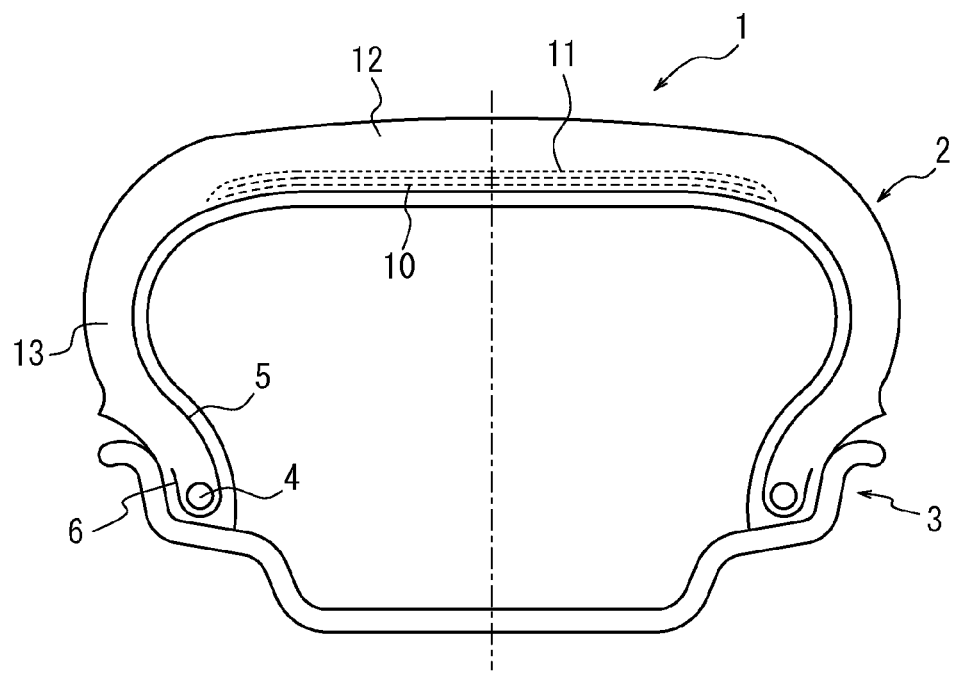
FIG. 1 is a widthwise sectional view illustrating a pneumatic radial tire according to an embodiment of the present invention, which is mounted on an applicable rim and inflated with a predetermined pneumatic pressure.
Figure 2:
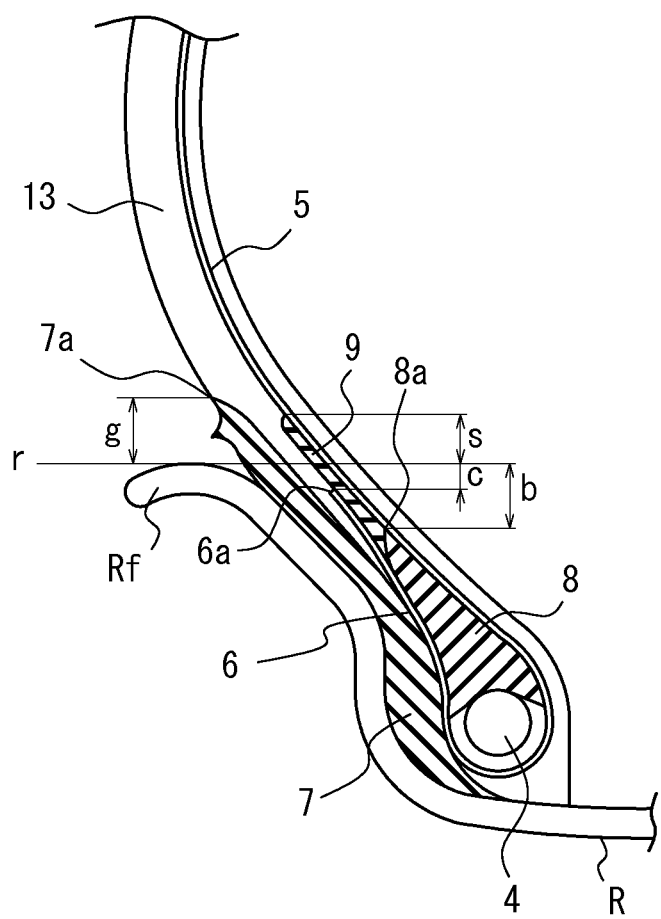
FIG. 2 is an enlarged sectional view illustrating a main portion of a bead portion in FIG. 1 in a more detail manner.

FIG. 1 is a widthwise sectional view illustrating a pneumatic tire according to an embodiment of the present invention, which is mounted on an applicable rim and inflated with a predetermined pneumatic pressure. FIG. 2 is an enlarged sectional view illustrating a main portion of a bead portion in FIG. 1 in a more detail manner.

In the drawing, the reference numeral 1 represents a tread portion, the reference numeral 2 represents a pair of side wall portions continuing to the respective side portions of the tread portion 1 and extending inwardly in the radial direction, and the reference numeral 3 represents a bead portion continuing to the inner side of each of the side wall portions 2 in the radial direction.

The pneumatic radial tire illustrated in the drawing has a carcass composes of a carcass ply having a body portion 5 and folded portions 6. The body portion 5 extends toroidally between the bead portion 3 and a bead core 4 having a circular shape in cross section and embedded in the bead portion 3, and the folded portion 6 is each side portion of the carcass ply and folded around the bead core 4 from the inner side to the outer side in the radial direction.

The carcass ply may include, for example, a steel cord or organic fiber cord extending in a direction perpendicular to the tire circumferential direction.

The bead portion 3 includes a rubber chafer 7 extending between a vicinity of a bead base and a vicinity of a bead heel in an area of the bead portion contacting with an applicable rim and located widthwise outward from the folded portion 6 of the carcass folded around the bead core 4, and a bead filler 8 arranged on the bead core 4 between the body portion 5 and the folded portion 6 of the carcass and having a generally triangle cross sectional shape extending outwardly in the radial direction with a thickness gradually decreasing toward the outer side of the bead core 4 in the radial direction, and a squeegee rubber 9 disposed on the outer side of the bead filler 8 in the radial direction. It is preferable that an outer end of the squeegee rubber 9 is placed outward from an outer end of a rim flange Rf in the radial direction.

Further, a belt 10 formed by two cord-intersecting belt layers in the drawing, a belt reinforcing layer 11, and a tread rubber 12 are arranged on the outer circumferential side in a crown area of the body portion 5 of the carcass in this order. Plural circumferential grooves extending in the tire circumferential direction and the like are formed on the surface of the tread rubber 12 although not illustrated.

A side rubber 13 is disposed on the outer face of the carcass in the tire width direction and extends over the side wall portion 2 and the bead portion 3.

Figure 3:
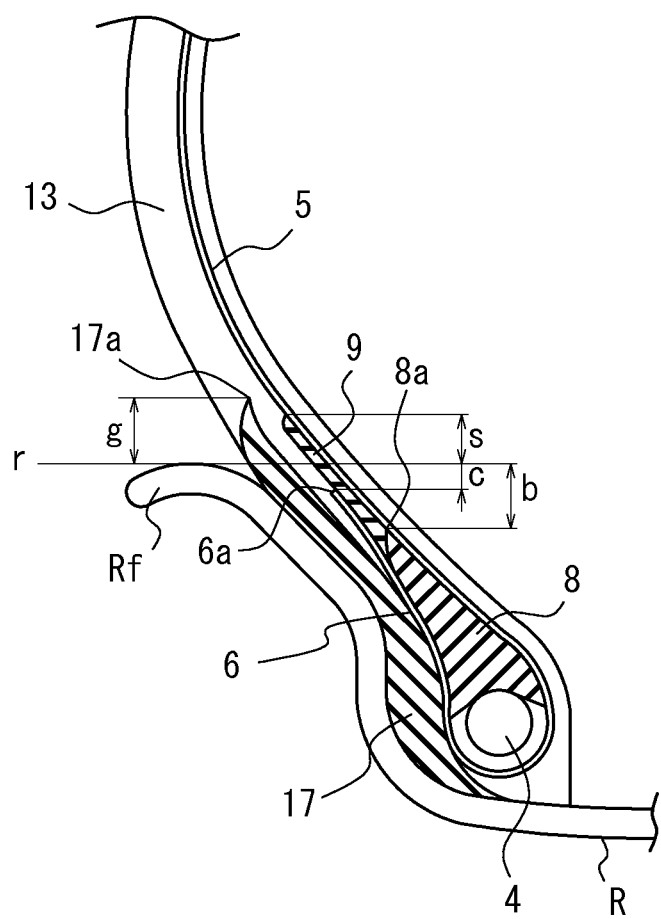
FIG. 3 is an enlarged sectional view illustrating a main portion of the bead portion in the state where another embodiment of the pneumatic radial tire according to the present invention is mounted on the applicable tire, and inflated with a predetermined pneumatic pressure.
Figure 4:
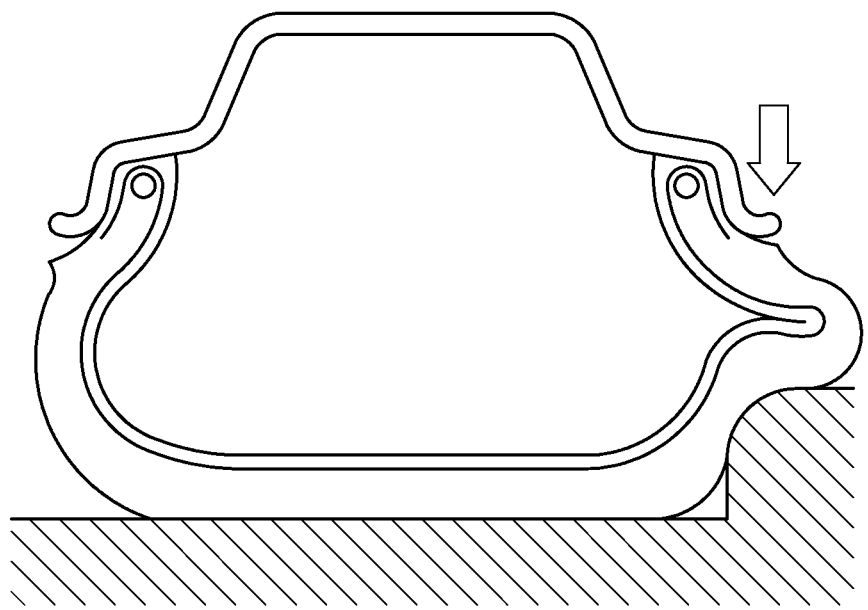
FIG. 4 is a widthwise sectional view illustrating a tire in a state where a pinch cut is occurring.

In the pneumatic radial tire, it is preferable that the outer end 6a of the folded portion of the carcass is placed inward from an outer end r of a rim flange Rf of an applicable rim R in the radial direction by a distance c in the range of −10 mm to +10 mm; an outer end 8a of the bead filler 8 is placed inward from the outer end r of the rim flange Rf of the applicable rim R in the radial direction by a distance b in the range of −15 mm to 0 mm; the outer end 7a of the rubber chafer 7 is placed outward from the outer end r of the rim flange Rf in the radial direction, preferably between a point located inward from the outer end 6a of the folded portion 6 of the carcass by 5 mm and the maximum width point of the tire in the radial direction, and more preferably by a distance g from the outer end r of the rim flange Rf to the maximum contacting area of the tire outer surface with the rim flange Rf. The term "maximum contacting area with the rim flange" as used in this specification means an area where the outer surface of the tire is brought into contact with the rim flange at the time when the tire is bent to deform. Further, at least a part of the side rubber 13 is disposed between the rubber chafer 7 and the folded portion 6 of the carcass, and in the drawing, the inner end of the side rubber 13 in the radial direction is placed inward from the outer end r of the rim flange Rf in the radial direction FIG. 3 is an enlarged sectional view illustrating in detail a main portion of the bead portion in the state where another embodiment of the pneumatic radial tire according to the present invention is mounted on the applicable tire and inflated with a predetermined pneumatic pressure. It should be noted that the same elements as those of the tire illustrated in FIG. 2 are denoted with the same reference numerals, and detailed explanation thereof will not be repeated. In this embodiment, an area of the rubber chafer 17 having a length of g extending from the outer end r of the rim flange Rf to an outer end 17a of the rubber chafer 17 in the radial direction is bent inwardly in the tire width direction from the outer surface of the tire so as to be embedded in the side rubber 13.

With this configuration, it is possible to avoid the concentration of strain at the end of the rubber chafer where a stepwise difference in rigidity exists, to prevent the occurrence of cracks at the end of the rubber chafer. Further, although the rubber chafer 17 is formed by a harder rubber as compared with the side rubber 13, and has reduced resistance to crack caused by the deterioration or repetitive strain, this configuration can prevent the occurrence of the crack by positioning the rubber chafer 17 so as not to expose a portion of an outer surface thereof located outward from the outer end r of the rim flange Rf in the radial direction, this outer surface being likely to deform in response to the deformation of the side portion.

It is preferable that, in the pneumatic radial tire, the squeegee rubber 9 is arranged between the body portion 5 and the folded portion 6 of the carcass, so that it is possible to reduce the concentration of strain and suppress the stepwise difference in rigidity occurring between the body portion 5 and the folded portion 6 of the carcass. Further, the side rubber 13 and the squeegee rubber 9 are adjacent to each other outward from the folded portion 6 of the carcass in the radial direction, so that it is possible to prevent the separation at the end portion of the folded portion 6 of the carcass.

It is preferable that the outer end of the squeegee rubber 9 is placed outward from the end portion 6a of the folded portion 6 of the carcass and the outer end r of the rim flange Rf in the radial direction, preferably by a distance s in the range of −15 mm to +15 mm. With this configuration, it is possible to reduce the strain between the folded portion 6 and the body portion 5 of the carcass, and reduce the occurrence of the strain caused by the stepwise difference in rigidity between the inner portion and the outer portion of the folded portion 6 of the carcass while maintaining the rigidity of the carcass. This makes it possible to prevent the occurrence of the separation and the pinch cut at the end portion of the folded portion 6 of the carcass. Additionally, the outer end of the rubber chafer 7 is placed outward from the outer end of the squeegee rubber 9 in the radial direction.

Further, it is preferable that 100% modulus of the side rubber 13 located between the rubber chafer 7 and the folded portion 6 of the carcass is in the range of ⅓ to ½ of 100% modulus of the rubber chafer 7, and more preferably 100% modulus of the squeegee rubber 9 is almost equal to the 100% modulus of the side rubber 13. With this range, it is possible to alleviate the concentration of stress at the carcass sandwiched between the curb and the rim flange Rf.

More specifically, in the case where 100% modulus of the side rubber 13 is less than ⅓ of that of the rubber chafer, the rigidity of the side rubber 13 is undesirably low, and the alleviation of the stress concentration occurring as a result of the rubber chafer 7 being brought into contact with the folded portion 6 of the carcass is reduced when the sandwiching of the carcass between the applicable rim and the curb occurs. On the other hand, in the case where the 100% modulus exceeds ½ of that of the rubber chafer, there is a tendency that the strain concentration cannot be dispersed. It may be possible to employ a configuration in which the end portion of the folded portion 6 of the carcass is embedded in the radially inner area of the side rubber. In this case, the side rubber can be located in an area from the side rubber 13 to the squeegee rubber in the drawing.

Further, it is preferable that the outer end 8a of the folded portion 6 of the carcass is placed inward from the outer end r of the rim flange Rf in the radial direction by −10 mm to +10 mm, so that it is possible to reduce the amount of rubber in the bead portion, thereby reducing the weight of the tire.

It is preferable that the outer end 8a of the bead filler 8 is placed inward from the outer end r of the rim flange Rf in the radial direction by −15 mm to 0 mm, so that it is possible to reduce the amount of rubber in the bead portion, thereby reducing the weight of the tire.

It is preferable that the outer end 7a of the rubber chafer 7 is placed between a point located inward from the outer end 6a of the folded portion 6 of the carcass by 5 mm and the maximum width point in the radial direction. With this configuration, the rubber chafer 7 having a higher rigidity is not used at the maximum width point where the bending deformation is large, whereby it is possible to prevent the deterioration in ride comfort of the tire. It is further preferable that the outer end 7a of the rubber chafer 7 is placed inward from the maximum contacting area of the outer surface of the tire with the rim flange Rf in the radial direction. With this configuration, the outer end 7a in the radial direction, where strain is likely to occur, and the outer end 6a of the folded portion 6 of the carcass in the radial direction are disposed so as not to overlap with each other in the tire width direction, whereby the concentration of strain can be suppressed, and the separation of the rubber in the vicinity of the outer end 6a of the folded portion 6 of the carcass in the radial direction can be prevented.

It is preferable that the outer end of the squeegee rubber 9 is placed outward from the outer end r of the rim flange Rf in the radial direction by −15 mm to −15 mm. With this configuration, in particular, it is possible to prevent the occurrence of the separation at the end portion of the folded portion 6 of the carcass.

EXAMPLE

Next, tires having structures as illustrated in the drawings and having a size of 175/70R14 were prepared. Example tire and Comparative Example tires 1 and 2, each having different characteristics as shown in Table 1, were evaluated in terms of tire weight, ride comfort, and pinch cut resistance. It should be noted that modification of the structure of the tire other than the bead portion is not required for Comparative Example tires, and thus, Comparative Example tires each have the same structure as Example tire except for the bead portion.

TABLE 1

Figure 5:
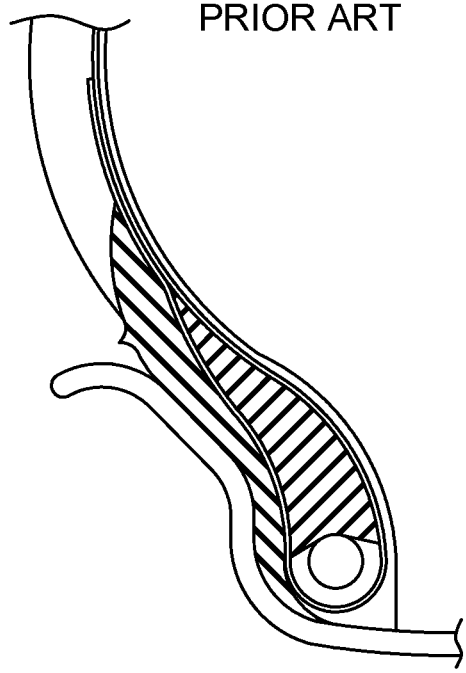
FIG. 5 is an enlarged sectional view illustrating a main portion of the bead portion of a conventional tire.
Figure 6:
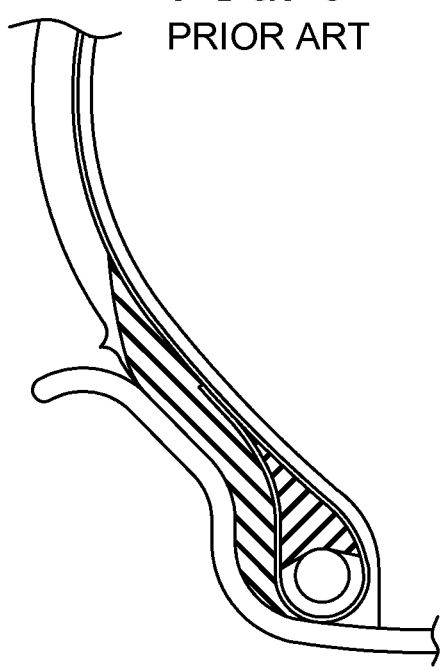
FIG. 6 is an enlarged sectional view illustrating a main portion of the bead portion of a conventional tire.

|  | Example tire | Comparative Example tire 1 | Comparative Example tire 2 |
|---|---|---|---|
| Enlarged view of bead portion | FIG. 2 | FIG. 5 | FIG. 6 |
| 100% modulus of rubber chafer (MPa) | 6 | 6 | 6 |
| 100% modulus of side rubber (MPa) | 2 | 2 | 2 |
| 100% modulus of squeegee rubber (MPa) | 2.4 | — | — |
| Height c of outer end of carcass folded portion in the radial direction (mm) *1 | −5 | +40 | −5 |
| Height b of outer end of bead filler in the radial direction (mm) *1 | −10 | +20 | −10 |
| Height of outer end of rubber chafer in the radial direction (mm) *2 | 15 | 15 | 15 |
| Height s of outer end of squeegee rubber in the radial direction (mm) *1 | 10 | — | — |

*1: Radial height from the outer end of the rim flange in the radial direction
*2: Radial height from the maximum contacting area with the rim flange

[Tire Weight]

For Example tire and Comparative Example tires 1 and 2, the tire weight was measured without being mounted on the applicable rim. Table 2 shows the evaluation results. It should be noted that index values in the table are calculated with the values of Comparative Example 1 being set to 100, and the larger value represents the heavier tire weight.

[Ride Comfort]

Example tire, and Comparative Example tires 1 and 2 were mounted on a rim with a size of 14-5.5 J and inflated with an inner pressure of 210 kPa, and applied to a vehicle. A driver traveled the vehicle on a test course, and evaluated the ride comfort through a feeling. Table 2 shows the evaluation results. It should be noted that the index values in the table were calculated with the values of Comparative Example 1 being set to 100, and the larger value represents the better ride comfort.

[Pinch Cut Resistance]

Example tire, and Comparative Example tires 1 and 2 were mounted on a rim with a size of 14-5.5 J and inflated with an inner pressure of 150 kPa. The load mass was set to a weight of the driver plus 60 kg, the traveling speed was changed between 50 m/h and 80 m/h, and a speed at which the pinch cut occurred at the time when the tire drove over a protrusion with a size of 60 mm disposed on the road surface was evaluated by indices. Table 2 shows the evaluation results. It should be noted that the index values in the table were calculated with the values of Comparative Example 1 being set to 100, and the larger value represents the better pinch cut resistance.

TABLE 2

|  | Example tire | Comparative Example tire 1 | Comparative Example tire 2 |
|---|---|---|---|
| Tire weight | 96 | 100 | 96 |
| Ride comfort | 105 | 100 | 105 |
| Pinch cut resistance | 100 | 100 | 96 |

As can be seen in Table 2, Example tire have improved ride comfort and pinch cut resistance while reducing its own weight as compared with Comparative Example tires 1 and 2.

EXPLANATION OF REFERENCE CHARACTERS

1 Tread portion
2 Side wall portion
3 Bead portion
4 Bead core
5 Body portion of carcass
6 Folded portion of carcass
6*a* Outer end in the radial direction
7, 17 Rubber chafer
7*a*, 17*a* Outer end in the radial direction
8 Bead filler
8*a* Outer end in the radial direction
9 Squeegee rubber
10 Belt
11 Belt reinforcing layer
12 Tread rubber
13 Side rubber
R Applicable rim
Rf Rim flange
r Outer end in the radial direction

The invention claimed is:

1. A pneumatic radial tire having:
a tread portion;
a pair of side wall portions;
a pair of bead portions, each bead portion including a bead core and having an area intended to contact with an applicable rim;
a carcass formed by plural carcass plies and having a body portion toroidally extending between the bead cores in the bead portions and a folded portion folded around each of the bead cores;
a rubber chafer arranged on the carcass ply in the contacting area of the bead portion;
a bead filler arranged on the bead core, the bead filler having a generally triangle cross sectional shape extending outwardly in the radial direction with a thickness gradually decreasing toward the outer side; and
a side rubber extending along an outer surface of the carcass in each of the side wall portions, wherein,
in a state where the tire is mounted on the applicable rim and inflated with a predetermined pneumatic pressure,
an outer end of the folded portion of the carcass and an outer end of the bead filler are placed inward from an outer end of a rim flange of the applicable rim in the radial direction;
an outer end of the rubber chafer is placed outward from the outer end of the rim flange in the radial direction;
on the position outward from the outer end of the rim flange in the radial direction, at least a part of the side rubber is disposed between the rubber chafer and the carcass; and
an area of the rubber chafer having a length extending from the outer end of the rim flange to an outer end of the rubber chafer in the radial direction is bent inwardly in the tire width direction from the outer surface of the tires so as to be embedded in the side rubber,
wherein a squeegee rubber is disposed between the body portion and the folded portion of the carcass;
an outer end of the squeegee rubber is placed outward from the outer end of the rim flange in the radial direction;
the outer end of the rubber chafer is placed outward from the outer end of the squeegee rubber in the radial direction.

2. The pneumatic radial tire according to claim 1, wherein the side rubber located between the rubber chafer and the folded portion of the carcass has 100% modulus in the range of ⅓ to ½ of that of the rubber chafer.

3. The pneumatic radial tire according to claim 1, wherein the side rubber located between the rubber chafer and the folded portion of the carcass has 100% modulus in the range of ⅓ to ½ of that of the rubber chafer.

* * * * *